United States Patent Office 2,987,567
Patented June 6, 1961

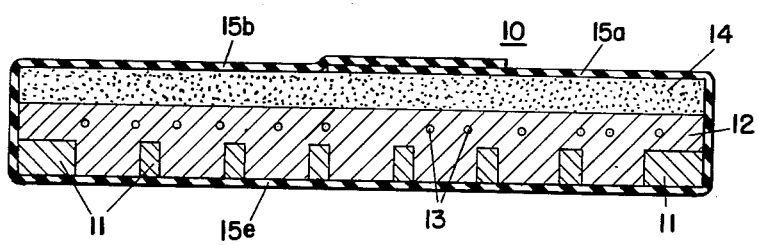
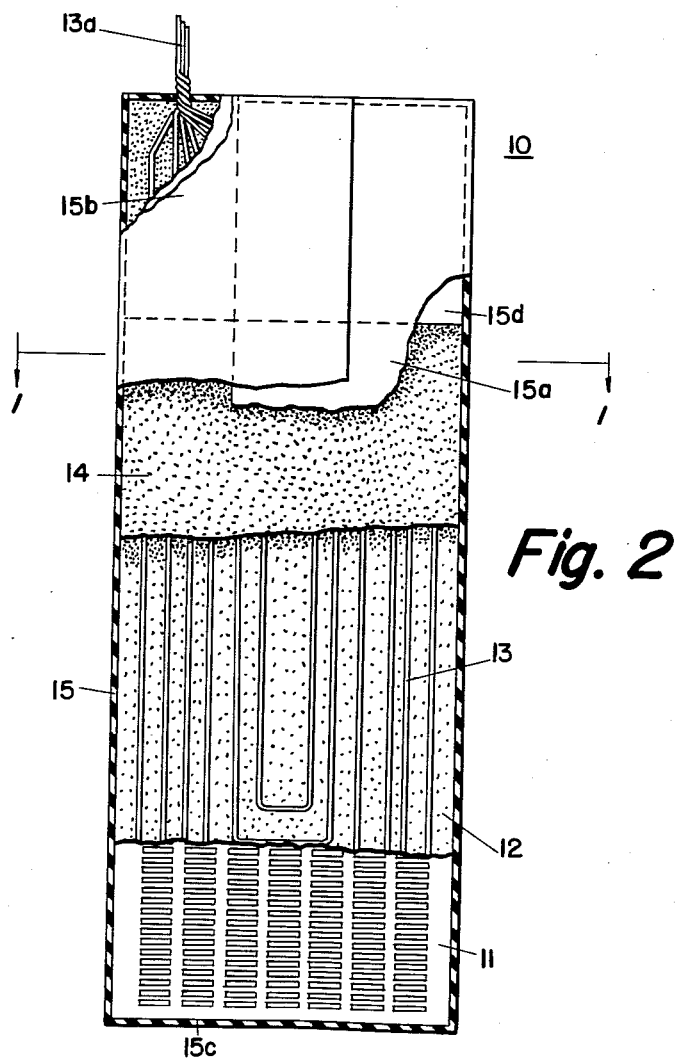

2,987,567
DRY-CHARGED NEGATIVE ELECTRODE
Clark R. Freas, Levittown, and William J. Schlotter, Norristown, Pa., assignors to The Electric Storage Battery Company, a corporation of New Jersey
Filed June 25, 1957, Ser. No. 667,805
2 Claims. (Cl. 136—9)

This invention relates to batteries of the alkaline type, more particularly to negative electrodes for such batteries and has for an object the manufacture of negative electrodes for dry-charged cells which are characterized by the fact there is present in each negative electrode both charged and uncharged materials.

In alkaline batteries, particularly of the silver zinc type, it has been found desirable to provide the negative electrodes with a reserve capacity in the unformed state. When the negative electrodes are assembled into cells together with electrolyte, the reserve capacity has been achieved by providing the negative, the zinc electrode, with an excess of material in the form of zinc oxide so that upon charging, only a fraction of the zinc oxide is converted to metallic zinc which is the active or charged material. The desirability of having an excess of negative capacity comes about because on repeated charge and discharge there is loss of negative capacity. This arises because some of the material loses its reversibility characteristic. While it has been relatively easy, as indicated, to provide an excess of negative capacity for the conventional type of storage batteries, there has remained a problem in providing an excess of negative capacity for batteries of the dry-charged type. The difficulty in part is due to the fact that the negative electrode of a dry-charged battery should have absent therefrom any electrolyte.

In carrying out the present invention in one form thereof, there is provided a dry-charged battery characterized by the absence of electrolyte, positive electrodes charged to the desired ampere-hour capacity for the battery, negative electrodes having formed or charged material corresponding in ampere-hour capacity to that of the positive electrodes and additionally, a substantial quantity of uncharged chargeable material such as zinc oxide. The negative electrodes in one form of the invention are characterized by the fact that they have present the charged material in the form of a layer of metallic zinc and bonded thereto a layer of zinc oxide which represents the uncharged chargeable material thereof.

For further objects and advantages of the invention, and for a detailed description of methods of practicing it, reference is to be had to the following description taken in conjunction with the accompanying drawing, in which:

FIG. 1 is an enlarged sectional view of a negative electrode taken on the lines 1—1 of FIG. 2; and FIG. 2 is an elevation of a negative plate embodying the invention with parts cut away to show the various layers thereof.

Referring to the drawing, a negative electrode 10 is illustrated as comprising a perforated plate 11 of zinc and a layer 12 of electrochemically active zinc. Embedded within layer 12 is a grid 13 of low electrical resistance material such as silver. A layer 14 of uncharged chargeable material such as zinc oxide is bonded to the layer 12. Opposite faces of the negative electrode 10 have disposed against them electrolyte-pervious sheet material such as indicated at 15a—15b and 15e.

The negative electrode of FIGS. 1 and 2 is characterized by the fact there is absent therefrom any electrolyte, such as potassium hydroxide. It is ideally suited to use in dry-charged cells or batteries. A dry-charged cell or battery is one in which electrolyte has not yet been added and in which the positive and negative electrodes include active or charged material in quantity to provide the desired ampere-hour capacity upon the addition of electrolyte. Batteries of this type are widely used in military applications and are likewise ideally suited to commercial applications. They have a relatively long shelf life.

It is to be understood that many variations may be made in the manner of practicing the invention and some of these will be pointed out in connection with the methods now to be described.

In a mold corresponding in size with the negative electrode 10 there is first disposed an electrolyte-permeable wrapper such as cellophane, non-woven fabric, or paper. Though it may be omitted entirely, it is preferred to utilize the perforated zinc plate 11 which is laid on top of the wrapper. The perforations in the plate 11 may be in the form of a multiplicity of thin slots or round openings, or of other configuration. Zinc oxide powder is then added over the plate 11 until the mold has been filled to a desired level. There is then pressed into the powder the grid 13, the mold having an opening at an edge portion for the extension of the multiplicity of lead wires 13a extending from the grid 13. The four panels 15a–15d of the wrapper 15 are then folded over the layer of zinc oxide. The mold is then placed in a press and a mating platen for the mold lowered onto the wrapper to apply pressure to the assembly as a whole. The applied pressure is of the order of several thousand pounds per square inch and adequate to cause the zinc oxide particles to adhere one to the other. The pressure used is not critical, though in general it will be preferred that it not be excessively high. Thus, the pressure can range from 1000 to 4000 pounds per square inch. The foregoing ranges of pressure are suited to plates which may be from 2" to 3" wide and 6" to 8" high. For plates of other sizes and with differing thicknesses, other pressures may be utilized. The assembly as a whole is then removed from the mold. The negative electrode assembly at this point has substantial rigidity provided by the zinc plate 11, the wrapper, the pressing operation and by the grid 13. The electrode has adequate strength for handling and for placement in electrolyte for the forming operation.

The electrolyte is preferably potassium hydroxide. The concentration is not critical. It can range from below 5% to above 40% but for forming purposes it is preferably of the order of a 5% aqueous solution. During the forming operation stainless steel electrodes may be utilized for the anodes with porous polyvinyl chloride separators preferably disposed between the anodes and the negative electrodes. Each negative electrode is fully charged, i.e., charging current is passed through the electrolyte for a time interval adequate to convert all of the zinc oxide to metallic zinc which forms the electrochemically active material of the electrode. The metallic zinc so formed is of a porous or spongy character. The active material 12, though of spongy character will, nevertheless, have substantial strength in that the particles do cohere together. The formed plate can be handled without difficulty or danger of breakage. The wrapper is then removed from the electrode and the electrode is thoroughly washed. It is washed, for example, with water for a time interval adequate to remove from the electrode as a whole any electrolyte absorbed therein. After the washing operation, it is dried preparatory to the next operation.

A dry wrapper 15 is placed in the mold. The formed electrode is placed in the mold and on the wrapper. There is then added a quantity of powdered zinc oxide. After the zinc oxide powder 14 has been added to provide the desired thickness, it is leveled and the panels 15a–15d of the wrapper 15 folded over the exposed upper face. The mold is then placed in a press and a mating platen for the mold lowered onto the wrapper to apply pressure to the assembly as a whole. As before, applied pressure is of the order of several thousand pounds per square inch and adequate to cause the zinc oxide particles to adhere one to the other and to layer 12. The pressure used is not critical, though in general it will be preferred that it not be excessively high since there would be danger of decreasing the porosity of the spongy zinc layer 12. Thus, the pressure can range from 1000 to 4000 pounds per square inch for plates of from 2" to 3" wide and from 6" to 8" high. For plates of other sizes and with differing thicknesses, other pressures may be utilized.

The negative electrode 10 as illustrated in FIGS. 1 and 2 is characterized by a grid-carrying spongy layer 12 of metallic zinc having adhered to at least one face thereof a layer 14 of coherent zinc oxide, the assembly being wrapped in suitable electrolyte-permeable material 15 such as that set forth above. If the negative electrode be carefully handled, the perforated zinc plate 11 may be omitted. The plate 11 itself is thin, of the order of three thousandths of an inch and though it adds strength to the preliminary assembly, so does the grid 13. Thus, if increased ruggedness be not required in the assembly of dry-charged batteries, the grid 13 and the pressing operations will impart adequate strength to the wrapped assembly to permit it to be handled both for the initial forming operation and the later assembly into batteries.

With the above understanding of the principles of the invention it is to be understood that the active metallic zinc 12 and the layer 14 of uncharged chargeable material need not be present in the form of layers in face-to-face relationship, but instead they may be present in the negative electrode in mixture one with the other. For example, spongy electrochemically active zinc may be ground to produce a fine zinc powder. This powder in the form of active material for the negative electrode is then thoroughly mixed with the zinc oxide. The mixture may be in any selected proportion. A mixture of 50% of charged material and 50% of uncharged chargeable material for the negative electrode will be selected where the zinc oxide is to be present in amount equal to the active material. Other proportions will be suitable for many applications.

The foregoing mixture is added as a powder to the wrapper material 15 in the mold after which the consolidating pressure is applied in the ranges specified above. The consolidated powder and the grid included therewith, will in the wrapped electrode, provide adequate strength for handling and subsequent use in the dry-charged cell or battery. In practicing this form of the invention, the forming, washing and drying step is omitted since these will have already been performed in the production of the dry electrochemically active zinc powder.

As in the first method of practicing the invention, the perforated plate 11 may be utilized with the mixture of metallic zinc and zinc oxide powder, or it can be omitted. A small quantity of water or polyvinyl alcohol may be added to the powdered zinc and zinc oxide mixture just prior to placing it into the mold. The addition of the water or polyvinyl alcohol adds strength to the dry-charged electrode.

The grid 13 itself while it has been illustrated as comprising a plurality of rectangular loops of silver wire, may take other forms and may include thin expanded-metal type of grids, preferably of silver. Silver is preferred as the grid material though copper, bronze or other metals of relatively low electrical resistance and chemically inert to the electrolyte may be used. These may be silver plated, if desired.

What is claimed is:

1. A negative electrode characterized by the absence therefrom of electrolyte for dry-charged alkaline batteries comprising a perforated zinc plate, electrochemically active zinc in current-carrying relation with said zinc plate, a current-carrying grid imbedded in said metallic zinc, at least one layer of zinc oxide in face-to-face relation with said metallic zinc and in electrical current-carrying relation therewith, and an electrolyte-pervious sheet material disposed against the opposite faces of the electrode.

2. The electrode of claim 1 in which said current-carrying grid is formed of silver wire forming within said layer of metallic zinc a plurality of loops with the ends of each loop extending toward the same exit point of the electrode to form a multiplicity of converging parallel current paths near the exit point and uniformly distributed over the remaining area of the electrode.

References Cited in the file of this patent

UNITED STATES PATENTS

| | | |
|---|---|---|
| 1,366,490 | Pouchain | Jan. 25, 1921 |
| 2,571,927 | Naumann et al. | Oct. 16, 1951 |
| 2,600,526 | Friedman | June 17, 1952 |
| 2,640,864 | Fischbach et al. | June 2, 1953 |
| 2,669,595 | Gary | Feb. 16, 1954 |
| 2,739,179 | Barrett | Mar. 20, 1956 |
| 2,830,108 | Peters | Apr. 8, 1958 |
| 2,838,590 | Garine | June 10, 1958 |